6 Sheets—Sheet 1.

E. HORTON.
GRAIN-BINDER.

No. 186,931. Patented Feb. 6, 1877.

Witnesses
John Pollitt
R. O. Humphrey

Inventor
Emmet Horton
By W. E. Simonds,
Atty.

6 Sheets—Sheet 2.

E. HORTON.
GRAIN-BINDER.

No. 186,931. Patented Feb. 6, 1877.

Witnesses.
John Pollitt
R. C. Humphrey

Inventor.
Emmet Horton
By W. E. Simonds
Att.

E. HORTON.
GRAIN-BINDER.

No. 186,931.

6 Sheets—Sheet 3.

Patented Feb. 6, 1877.

Witnesses.
John Pollitt
R. O. Humphrey

Inventor,
Emmet Horton
By W. E. Simonds,
Atty.

6 Sheets—Sheet 4.

E. HORTON.
GRAIN-BINDER.

No. 186,931. Patented Feb. 6, 1877.

Witnesses
John Pollitt
R. O. Humphrey

Inventor.
Emmet Horton
By W. E. Simonds
atty.

N. PETERS, PHOTO-LITHOGRAPHER, WASHINGTON, D. C.

6 Sheets—Sheet 5.

E. HORTON.
GRAIN-BINDER.

No. 186,931. Patented Feb. 6, 1877.

Witnesses
John Pollitt
R. P. Humphrey

Inventor
Emmet Horton
By W. E. Simonds
Atty.

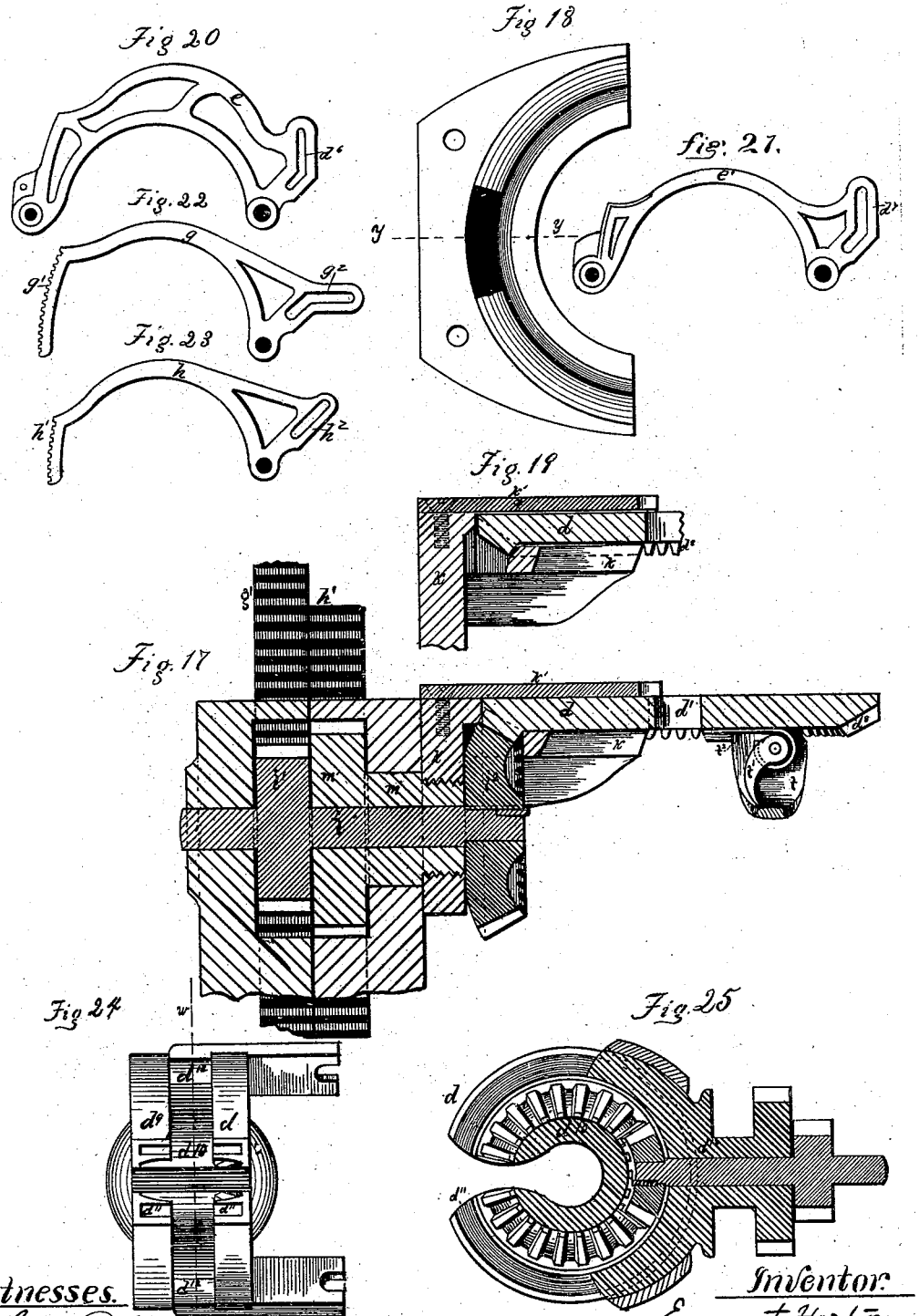

UNITED STATES PATENT OFFICE.

EMMET HORTON, OF HARTFORD, CONNECTICUT, ASSIGNOR OF TWO-THIRDS HIS RIGHT TO AMOS WHITNEY AND JOHN JOHNSON, OF SAME PLACE.

IMPROVEMENT IN GRAIN-BINDERS.

Specification forming part of Letters Patent No. 186,931, dated February 6, 1877; application filed December 22, 1876.

*To all whom it may concern:*

Be it known that I, EMMET HORTON, of Hartford, in the county of Hartford and State of Connecticut, have invented certain new and useful Improvements in Grain-Binding Attachments for Harvesters, of which the following is a specification, reference being had to the accompanying drawings, where—

Figure 1:
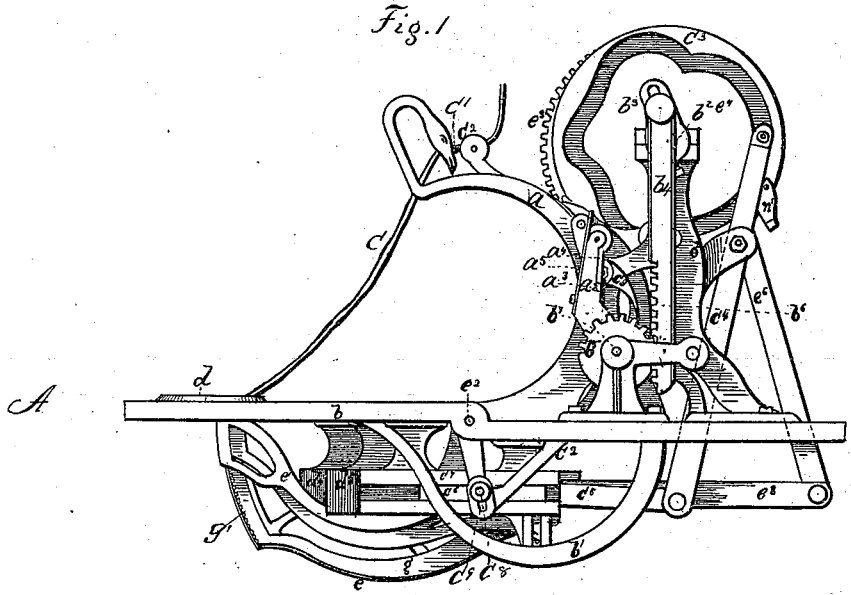
Figure 2:
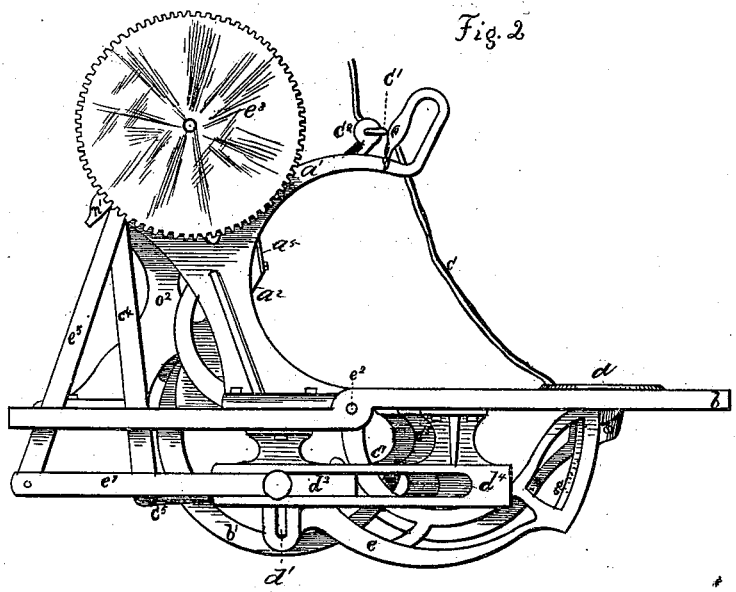
Figure 3:
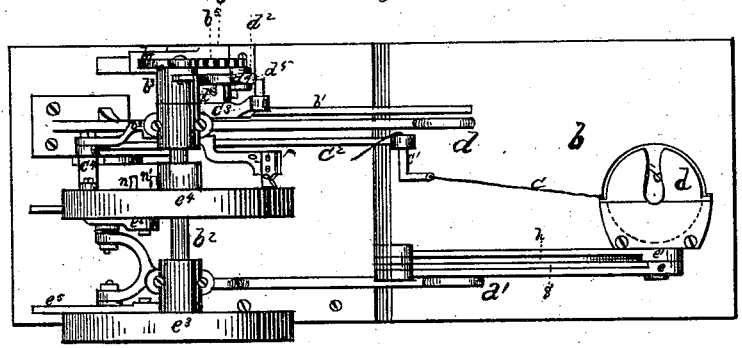
Figure 4:
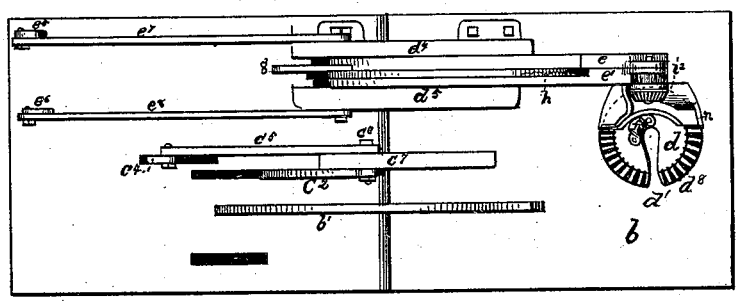
Figure 7:
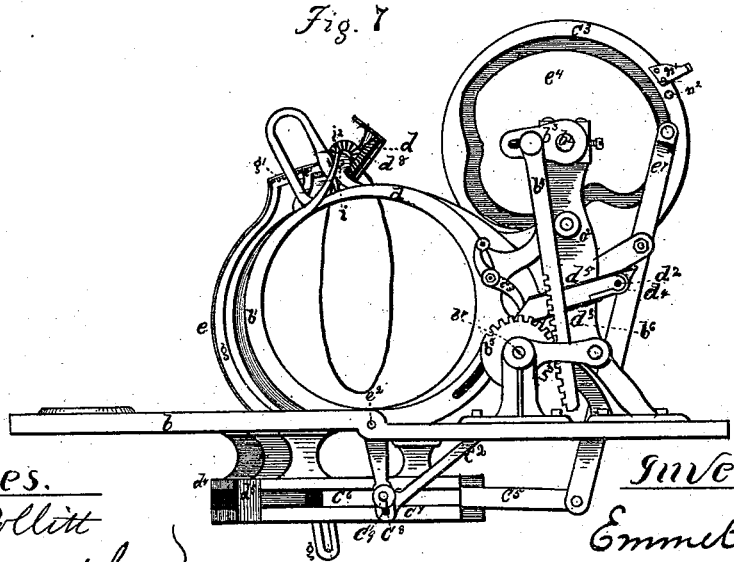
Figure 5:
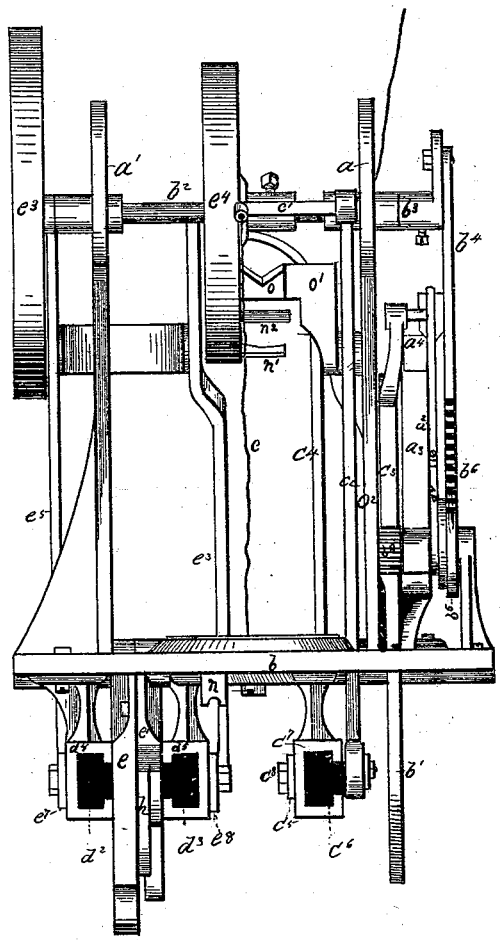
Figure 6:
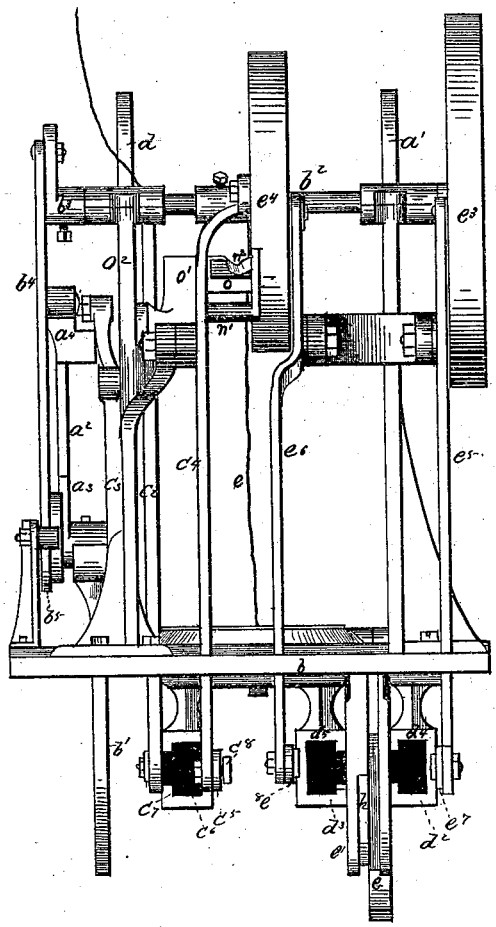
Figure 8:
Figure 9:
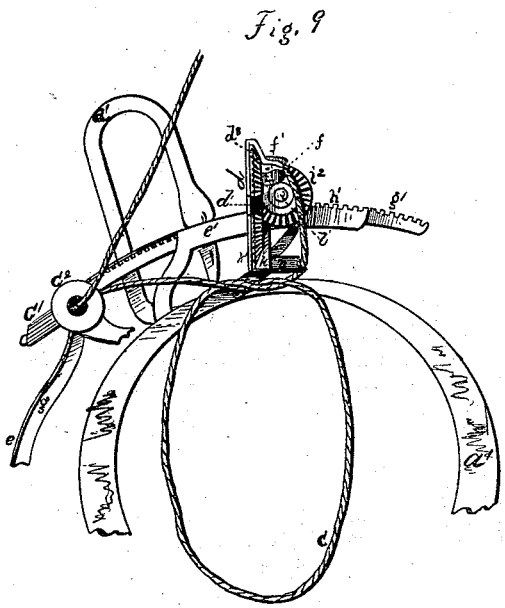
Figure 10:
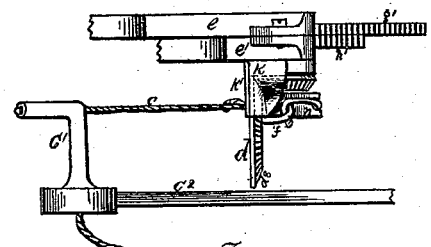
Figure 11:
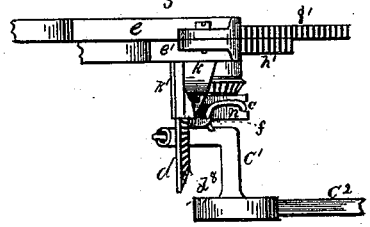
Figure 12:
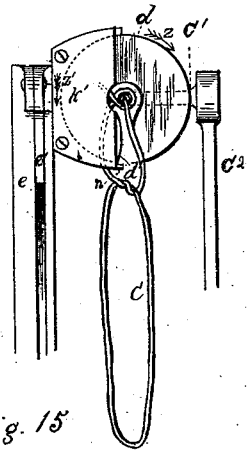
Figure 13:
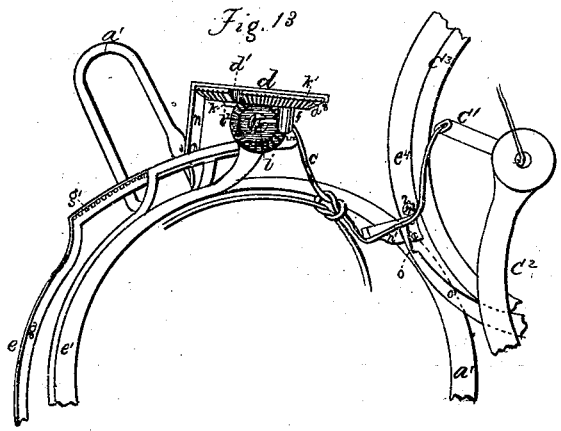
Figure 15:
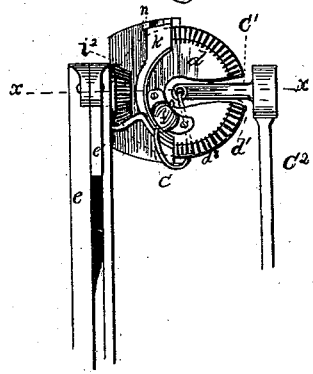
Figure 14:
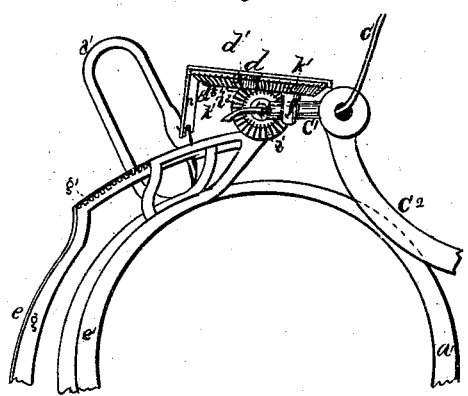
Figure 16:
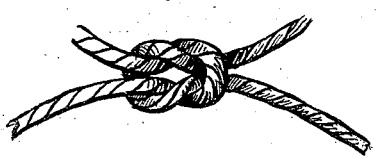

Figure 1 is a right-side view of mechanism embodying the principles of my said improvements, considering the end A the front end. The mechanism is shown in the adjustment it has when at rest, and while not engaged in binding a bundle of grain. Fig. 2 is a left-side view of the same mechanism and in the same adjustment. Fig. 3 is a top view of the same mechanism in the same adjustment. Fig. 4 is a bottom view of the same mechanism in the same adjustment. Fig. 5 is a front-end view of the same mechanism in the same adjustment. Fig. 6 is a rear-end view of the same mechanism in the same adjustment. Fig. 7 is a right-side view of the same mechanism, with the grasper-arm (which grasps and holds the bundle of grain while being bound) moved up into position for grasping a bundle of grain, and with the tier-arm (meaning the arm bearing the main part of the knot-tying mechanism) moved up ready to commence tying. Fig. 8 is a front view of the knot-tying parts only, apparently in about the same adjustment as in Fig. 7, but really the slotted disk (more fully explained hereinafter) has made one and one-fourth revolution from the adjustment shown in Fig. 7, and has put into the twine the twist for a single knot. Fig. 9 is a right-side view of the knot-tying parts only, with the first knot tied and drawn tight. Fig. 10 is a top view of the same parts shown in Fig. 9, in the same adjustment. Fig. 11 is a top view of the knot-tying parts only, in the same adjustment as in Figs. 9 and 10, except that the needle-arm has retreated, so that the needle just projects through the slot in the slotted disk, and the parts are all ready to give the twist to the twine for the second knot. Fig. 12 is a front view of the knot-tying parts only, with the twist for the second knot given to the twine. Fig. 13 is a right-side view of the knot-tying parts, with the second knot drawn tight, and the twine about to be cut and severed from the twine-ball. Fig. 14 is a right-side view of the knot-tying parts only, with the twine-needle entered into the twine-hold, so as to release the end of the twine, which is now tied around the bundle of grain, and fasten in a fresh end. Fig. 15 is a front view of the knot-tying parts only, in the adjustment they last assume before returning to the adjustment shown in Figs. 1, 2, 3, 4, 5, and 6. Fig. 16 is a view of the "double square knot" tied by this mechanism. Fig. 17 is an enlarged detail view of the knot-tying parts only, in central section through the plane indicated by the dotted line $x\,x$ in Fig. 15, omitting the twine-needle and needle-arm, and the disk rotated so as to show a section of the twine-hold. Fig. 18 is a detail view of the box which carries the slotted disk, showing that side of the box which is next to the face of the slotted disk—meaning by the face that side carrying the bevel-gear. Fig. 19 is a view, in section, of the box shown in Fig. 18, and its appurtenant parts, on the plane indicated by the dotted line $y\,y$. Fig. 20 is a detail side view of the arm hereinafter designated as the arm $e$. It is the left-hand one of the two arms which together constitute the tier-arm. Fig. 21 is a detail side view of the arm hereinafter designated as the arm $e^1$. It is the right-hand one of the two arms which together constitute the tier-arm. Fig. 22 is a detail side view of the arm hereinafter designated by the letter $g$. It is an arm bearing a segmental rack, the left-hand one of two similar ones. Fig. 23 is a detail side view of the arm hereinafter designated by the letter $h$. It is the right-hand one of two similar parti-circular racks. Fig. 24 is a right-side view of a modification of the slotted disk. Fig. 25 is a view, in section, of the modification shown in Fig. 24, the plane of the section indicated by the dotted line $w\,w$, Fig. 24.

This machine or mechanism is an adjunct of, or attachment for, a reaper or harvester, and operated by the harvester, giving rotary motion to gear $e^3$, in direction shown by arrow $o^3$. It makes use of twine for binding the bundles of grain, tying the ends of the string in a double square knot, without losing hold of either end of the twine while the knot is tied. The grain is cut by the harvester, and by proper means (intended to form the subject-matter of other Letters Patent) swept, in sufficient quantity for a single bundle, against the two stationary arms $a$ $a^1$, which rise from, and are rigid on, the base-plate $b$.

The bundles of grain are omitted from the drawings, so as not to cover up the parts of the mechanism. The twine is designated by the letter $c$. This twine is used in the form of a common ball, and is held in a common twine-ball holder stationed over the needle $c^1$.

I have not deemed it necessary to show the twine-ball holder in the drawings. Suffice it to say, upon this point, that the twine $c$ runs from the twine-ball holder down and through the needle $c^1$, which is hollow and right-angled, being fixed to the side of the vibratory needle-arm $c^2$. Coming out from the point of the hollow needle, the twine runs down and through the slot $d^1$ in the rotary slotted disk $d$, the end of the twine entering into, and being held by, the twine-hold $f$, more fully described hereinafter, which is on that side or face of the slotted disk $d$ which I call the "back."

The position of the twine shown in Figs. 1, 2, and 3 is the position it has before a bundle of grain (not yet bound) is swept against the arms $a$ $a^1$. When a bundle is thus swept against these two arms the twine is pushed back by the bundle and made to partially encircle the bundle. The grasper-arm $b^1$ now swings up, (see Fig. 7,) and grasps the bundle; and its operating mechanism is such that each bundle, whether more or less in quantity, within reasonable limits, is grasped or squeezed with the same and equal pressure; and I will describe the mechanism for operating this grasper-arm at this point. The letter $b^2$ indicates the main shaft of the whole device, on one end of which is the crank-arm $b^3$, from which depends the pitman $b^4$, on one side of which is the gear-rack $b^6$, meshing into the parti-pinion $b^5$ on the same shaft, $b^7$, with which is the arm $a^2$, which is thereby caused to vibrate from the position shown in Fig. 1 backward, so as to nearly touch the base-plate and return. The grasper-arm $b^1$ is pivoted upon the shaft $b^7$.

The butt-end of the grasper-arm bears the pawl-ratchet $b^8$, and a collar or sleeve is on the side of this pawl-ratchet. To this collar is attached the spring $a^3$, coiled around the collar, and then running off at a tangent. To the back side of the arm $a^2$ is pivoted a pawl, $a^4$, which can swing out from the arm $a^2$, but is held against the arm by the spring $a^5$.

When the arm $a^2$ vibrates backward, the pawl $a^4$ bears against the spring $a^3$, and thereby raises the grasper-arm till the grain offers resistance enough to cause the spring $a^3$ to slip past the pawl $a^4$, and the grasper-arm is held at this point by the pawl $c^3$, striking into the ratchet $b^8$. The grasper-arm holds the bundle thus grasped till bound, when, the arm $a^2$ returning, the pawl $a^4$ trips past the spring $a^3$, and the arm $a^2$, striking the pin $c^4$, raises the pawl $c^3$ off the ratchet $b^8$, and permits the grasper-arm to fall below the base-plate. (See Fig. 1.) After the grasper-arm has moved up and grasped the bundle of grain, preparatory to its being bound, the tier-arm, composed of the two arms $e$ and $e^1$, moves up, as seen in Fig. 7. This tier-arm is operated from the cams $e^3$ $e^4$, which have cam-grooves in their opposed faces, operating through the levers $e^5$ $e^6$, the pitmen $e^7$ $e^8$, and the slides $d^2$ $d^3$, reciprocating in ways $d^4$ $d^5$, these slides having a rigid connecting-pin, running through slots $d^6$ $d^7$, which are in those parts of the arms $e$ $e^1$ which are underneath the base-plate $b$, in which is a suitable mortise or slot, to permit the play of the tier-arm through the base-plate, and there is a similar mortise for the grasper-arm. The cam-grooves in the cam-disks $e^3$ $e^4$ give those motions to the tier-arm described in the progress of this specification.

The moving up of the tier-arm into the position shown in Fig. 7 causes the twine to entirely encircle the bundle of grain, and as the slotted disk $d$ has gone past, or to the rear of, the needle $c^1$—the needle passing through the slot $d^1$—the end of the twine, which is fast in the twine-hold $f$, has gone past what is practically, though not really, the other end of the twine—that is, the twine coming from the point of the needle, which turns backward and runs through the slot $d^1$ in the slotted disk $d$. The disk $d$ has now made one-eighth of a longitudinal revolution backward, bringing the face of the disk at right angles to the twine as it runs from the point of the needle backward and around the bundle, and the disk has made one-sixteenth of a lateral revolution forward, to the position shown in Fig. 7.

The slotted disk $d$ now makes one and one-fourth revolution forward. (I term that direction forward indicated by the arrow Z in Fig. 12, because it is the motion which gives the twist to the twine for the knots, and as the slotted disk has two different kinds of rotation, I term this kind, whether forward or backward, "lateral.") The lateral rotation of the slotted disk is its rotation around its own axis, like that of a common wheel. The slotted disk is carried by the box $k$, and this box has a rotation at right angles to the lateral rotation of the disk, carrying the disk with it, and this rotation of the disk I term "longitudinal," and when this longitudinal rotation is in the direction indicated by the arrow Z′, Fig. 12, I term it "forward." The one and one-fourth revolution last mentioned brings the parts into the position shown in Fig. 8, twisting the two ends (called ends for convenience' sake, though the twine starting from the needle $c^1$ is not really an end) of the twine about each other, giving the whole twist for a single knot.

In order to make the description of the movements of the slotted disk intelligible, it seems requisite that I should at this point explain the parts which give the motions of the slotted disk. Between the two arms $e$ and $e^1$, and upon the same pin $e^2$, are pivoted two arms, $g$ and $h$, each bearing near its free end a segmental rack, $g^1$ and $h^1$, the rack being an arc of a circle, of which the pin $e^2$ is the axis. The ends of these arms $g\ h$, which are underneath the base-plate $b$, have slots $g^2\ h^2$, (see Figs. 22 and 23,) and the same pin which runs through the slots in the arms $e\ e^1$ runs through the slots $g^2\ h^2$, and gives motion to the arms $g\ h$. These arms $g\ h$ rise and fall with the arms $e\ e^1$, but they have movements for actuating the slotted disk $d$ independent of the arms $e\ e^1$.

In the end of the tier-arm is hung the shaft $i$, bearing the pinion $i^1$, meshing into the rack $g^1$, and also bearing the bevel-pinion $i^2$, meshing into the bevel-gear $d^8$ on the slotted disk, and the lateral revolution of the slotted disk is given through this connection. The slotted disk is carried in the box $k$, having plate $k'$ screwed thereto, and this box is screwed and fastened on the sleeve $m$, which is on the side of the pinion $m'$, which meshes into the rack $h^1$. The pinion $m'$, collar $m$, and box $k$ are all hung on the shaft $i$, but are not fixed to it. This connection gives the box $k$ and the slotted disk $d$ their longitudinal rotation.

But previous to digressing, in order to explain how the rotations of the slotted disk are given, I left the parts in the adjustment shown in Fig. 8. I will now proceed from that point.

The needle-arm $c^2$ now moves forward to the position shown in Fig. 9. During the same time the slotted disk $d$ makes five-eighths of a longitudinal revolution forward, bringing the face of the disk $d$ toward the front, and while this five-eighths longitudinal revolution is being made the disk $d$ turns five-sixteenths of a lateral revolution backward, so that the slot $d^1$ points to the right. This last-mentioned five-sixteenths lateral backward revolution of the disk $d$ is caused by the last-mentioned five-eighths longitudinal revolution, the rack $g^1$ having remained stationary meanwhile. The mechanism is now in the adjustment shown in Fig. 9, with the first knot drawn, tightened, and finished. The needle-arm $c^2$ now retreats to the position shown in Fig. 11, with the needle $c^1$ projecting through the slot $d^1$ in the disk $d$, all ready to give to the twine the twist for the second knot. The slotted disk $d$ now makes one and one-fourth lateral revolution forward, so that the slot $d^1$ points straight downward. If the disk alone were considered, the motion would be called backward, for the disk now has its back to the front, while it had its face to the front when twisting the first knot; but so far as the twisting motion given to the string or twine is concerned the motion is forward. If the motion were not now essentially forward the knot would be a "granny" instead of a square knot. The last-mentioned one, and one-fourth lateral revolution of the disk $d$ gives to the twine the twist for the second knot. The guard or hook $n$ holds the first knot down while the second knot is being tied. The next movement is to draw apart the two ends of the twine, so as to tighten the second knot. The needle-arm $c^2$ retreats, as shown in Fig. 13. The disk $d$ makes a little more than one-fourth of a longitudinal revolution backward, so as to throw the face of the disk $d$ upward, so as to bring the twine-hold directly on the circular line described by the needle as it vibrates. The disk $d$ makes a little more than a one-eighth lateral revolution backward. The twine coming from the needle $c^1$ is drawn under the angle-arm $n^1$, and under the pin $n^2$, attached to the cam $e^4$, and across the edge of the knife $o$, which is on the arm $o^1$, adjustably fixed to the standard $o^2$.

The rotating movement of the cam $e^4$ now causes the pin $n^2$ to press the twine down upon the knife $o$ and sever it, leaving about one and one-fourth inch of twine projecting from the needle $c^1$. The needle-arm $c^2$ now moves forward to the position shown in Fig. 14, the needle $c^1$ entering the twine-hold $f$, releasing the end of the twine, which is now tied around the bundle, and entering and fastening a fresh end.

I will describe this twine-hold. (See Fig. 17.) The outer case $f$ is mortised straight through, and within the mortise is hung the cam-latch $f^1$, its edge or point held down by the spring $f^2$. The point of the needle $c^1$ is beveled off, so that it can readily raise the cam-latch as it enters, release the old end of twine, and enter and fasten a fresh end. The needle now retreats from the twine-hold far enough to allow for the longitudinal turn of the disk $d$, which now makes about a one-eighth lateral revolution backward, leaving the slot $d^1$ pointing to the right. The disk, at the same time, makes about a one-fourth longitudinal revolution backward, bringing the back of the disk $d$ to the front. This adjustment is shown in Fig. 15. The needle-arm $c^2$ now moves forward, while the tier-arm $e\ e^1$, with the arms $g\ h$, falls to the position shown in Figs. 1, 2, and 3, and the binding of a bundle is complete.

The needle-arm $c^2$ is operated from the cam-groove $c^3$ in the right side of cam $e^4$, operating through the lever $c^4$, connecting-rod $c^5$, slide $c^6$, working in ways $c^7$, and pin $c^8$, projecting from slide $c^6$ into slot $c^9$ in the butt of the needle-arm.

Figs. 24 and 25 show a modification of the slotted disk $d$, whereby the gear on the disk is covered up. The disk $d$ in these figures is substantially the same as in the other figures; but there is another similar disk, $d^9$, covering up the gear on the disk $d$, and connected to the disk $d$ by the central connection-piece $d^{10}$. Both the disks $d$ and $d^9$ have similar annular grooves $d^{11}$, fitting to and turning upon corresponding collars on the part $d^{12}$, which answers to the box $k$ in the other figures.

I claim as my invention—

1. The combination of the pivoted vibratory tier-arm $e$, the pivoted vibratory rack-arms $g$ (bearing rack $g^1$) and $h$, (bearing rack $h^1$,) the pinions $i^1$ $m'$, shaft $i$, sleeve $m$, disk-box, bevel-pinion $i^2$, and slotted disk $d$, the several parts being constructed, arranged, and combined to operate substantially as shown and described.

2. The combination of the slide $d^2$, the pin projecting from the side of the slide $d^2$ into the slots $d^6$ $g^2$ $h^2$, the pivoted vibratory arm $e$, the pivoted vibratory rack-arms $g$ (bearing rack $g^1$) and $h$, (bearing rack $h^1$,) and the knot-tying parts $i^1$ $i$ $i^2$ $d$ $k$ $m$ $m'$, the several parts being constructed, arranged, and combined to operate substantially as shown and described.

3. The combination of the slide $c^6$, pin $c^8$, working in slot $c^9$, and the needle-arm $c^2$, arranged and operating substantially as shown and described.

4. The combination of the vibratory needle-arm $c^2$, bearing the needle $c^1$, with the vibratory tier-arms $e$ $e^1$, bearing the slotted disk $d$, all three of these elements having the motions described, and at the relative times substantially set forth and specified.

5. The combination of the stationary arms $a$ $a^1$, the vibratory grasper-arm $b^1$, the vibratory needle-arm $c^2$, bearing the needle $c^1$, and the vibratory tier-arms $e$ $e^1$, bearing the slotted disk $d$, substantially as and for the purpose specified.

EMMET HORTON.

Witnesses:
  WM. E. SIMONDS,
  JOHN HENRY BROCKLESBY.